United States Patent Office 2,794,924
Patented June 4, 1957

2,794,924

METHOD AND APPARATUS FOR DETERMINING A COMPONENT IN A GASEOUS MIXTURE

Charles W. Skarstrom, Montvale, N. J., assignor to Esso Research and Engineering Company, a corporation of Delaware Application April 5, 1954, Serial No. 421,123

11 Claims. (Cl. 250—43.5)

This invention relates to improvements in the non-dispersion infra-red analysis of gases. More particularly it relates to the analysis of gases in which pulsations of radiant energy are produced using a novel source of infra-red radiation to irradiate a thermal detector. The radiant energy is produced by alternatively pressurizing and de-pressurizing the sample gas to be analyzed. There is thus produced characteristic pulsed radiant energy which is passed through gas filters for selectively measuring key stream components by means of a thermal detector, amplifier and recorder.

The radiant energy produced by alternatively pressurizing and de-pressurizing the gas to be analyzed is a transient effect of short duration. Useful advantage is taken of this brief effect which is especially strong for common hydrocarbon gases found in petroleum refinery streams and the invention will be particularly described in connection therewith.

The radiation emitted during the compression cycle of a hydrocarbon gas is infra-red radiation of assorted wavelengths and intensities. These radiations are caused by the gas becoming hotter than its surroundings due to the compression. Increased molecular translational energy due to the heating is transformed in part by molecular collisions into increased vibrational and rotational energy within each molecule. Some of this energy is now radiated away in all directions to relieve the internal stresses in the molecules. The frequencies (wavelengths) and intensities of this radiation are characteristic of each type of molecule. These characteristic frequencies and intensities are well known for each species. They are found by obtaining an absorption spectrum of each compound. These spectra are published in books on the subject.

During the expansion cycle the molecular translational energy is much reduced due to the cooling effect. Through molecular collisions some of the vibrational and rotational energy of the molecules is transformed into increased translational energy. This reduces the cooling effect due to the expansion. It also allows the molecules to absorb their characteristic frequencies of radiation from the surroundings. Thus the surroundings are cooled slightly because of the momentary disappearance of these characteristic frequencies.

Figure 1:
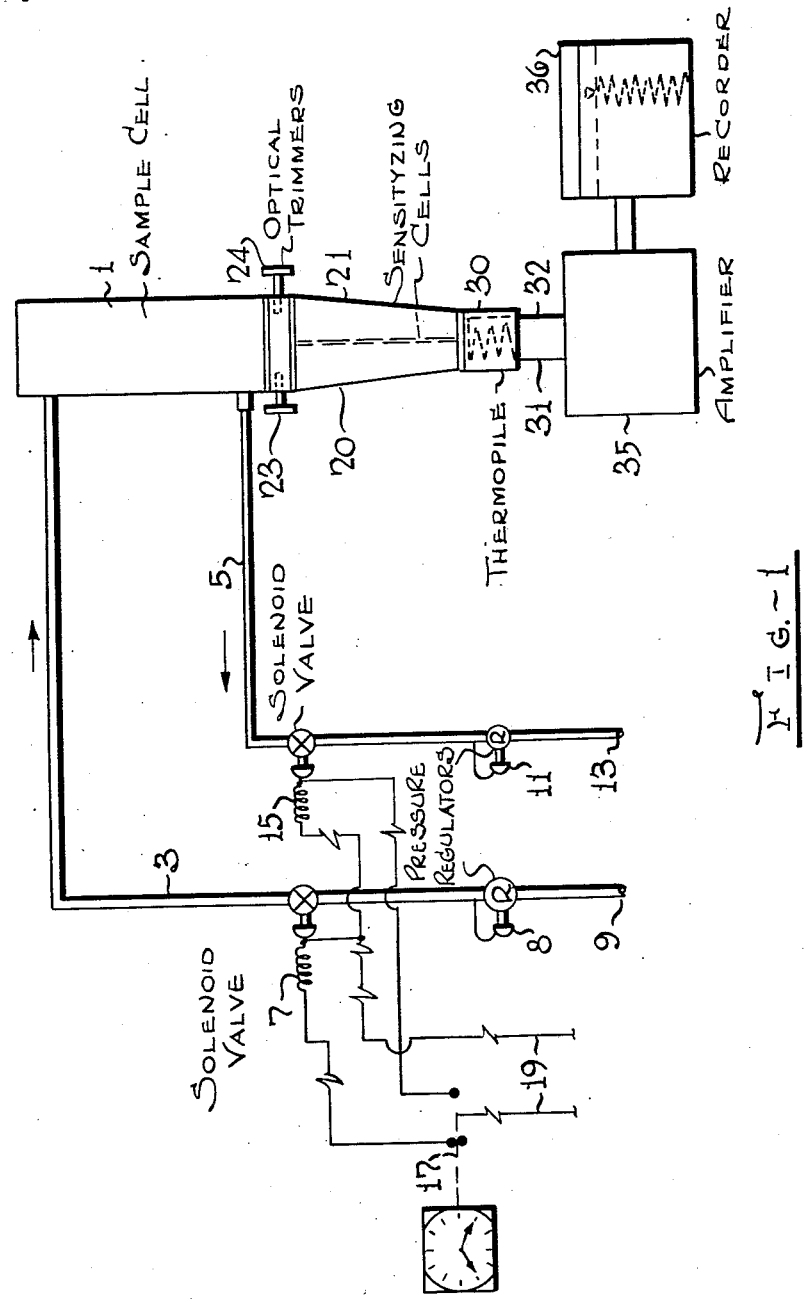

The invention will be fully understood from the following description taken in connection with the accompanying drawings in which Figure 1 is a diagrammatical view showing one form of apparatus for carrying out the invention.

Figure 2:
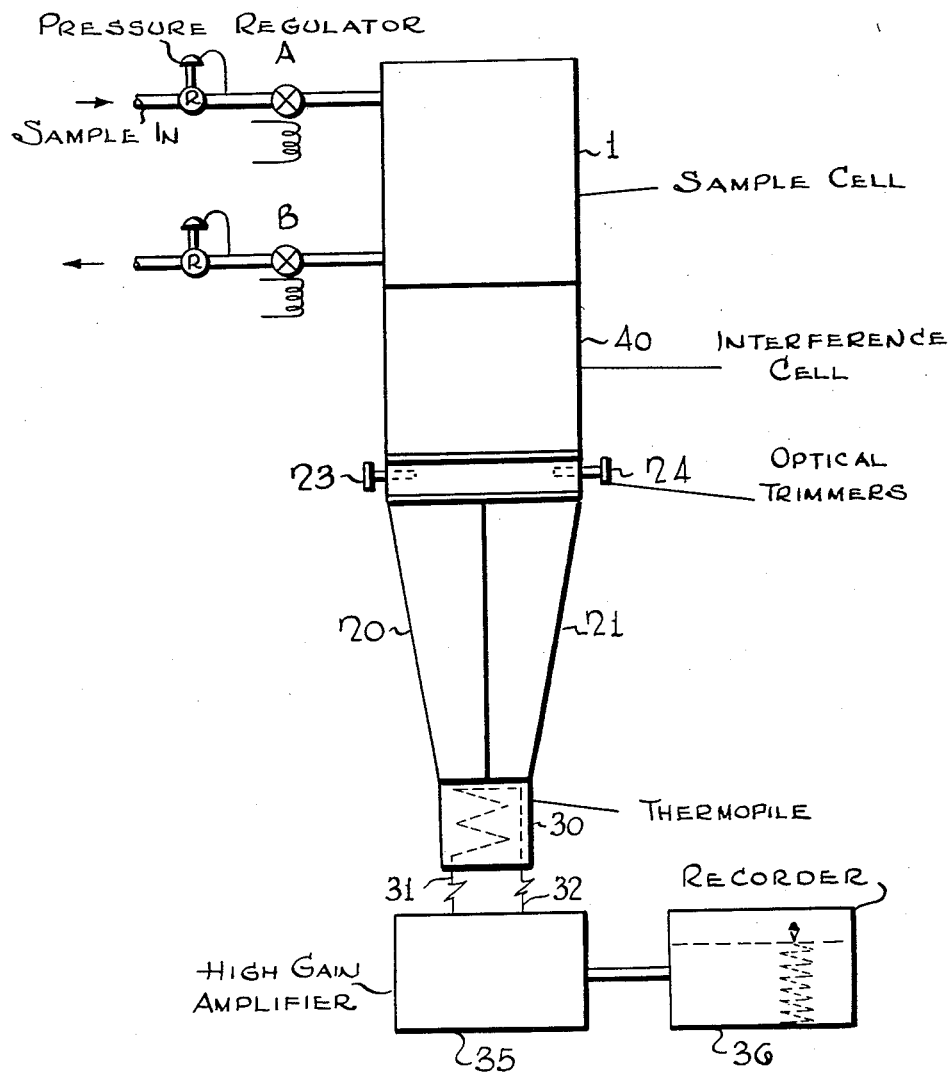

Figure 2 is a diagrammatical view of another form of apparatus for carrying out the invention.

Referring particularly to Figure 1 of the drawings, reference numeral 1 designates a sample cell adapted to continuously receive the gas to be analyzed which is fed into the sample cell through a line 3 and is discharged through a line 5. The line 3 connects to a constant pressure supply of sample gas through a solenoid valve 7. The pressure regulator in line 7 is designated 8, and the source of sample gas as 9. The vent line 5 from the sample cell feeds through a pressure regulator 11 to a vacuum line or vent 13, that is to a regulated reduced pressure, through a solenoid valve 15. The solenoid valves are alternately actuated by a clock driven toggle switch 17 connected to the 110 volt lines 19 which lead from a source of electric energy not shown. The clock driven toggle switch 17 can, for example, control the solenoid valves 7 and 15 in such a way that solenoid valve 7 is open and solenoid valve 15 is closed for 30 seconds, followed by solenoid valve 15 being open and solenoid valve 7 being closed for the next 30 seconds. The sample cell 1 continues alternately containing a pressure of, for example, 1 atmosphere for 30 seconds and then ¼ atmosphere for 30 seconds as a result of which radiant energy characteristic of the gases issues from and enters into the sample cell in pulsations.

This pulsed radiant energy is passed through gas filters for selectively measuring key stream components which are now to be described. Two conical sensitizing cells 20 and 21 which in one embodiment are about 3″ long receive the pulses of radiation which emerge past optical trimmers 23 and 24 respectively and funnel the pulses of radiant energy on to a thermopile 30 which can be, for example, a 20 junction thermopile, 10 junctions of which are mounted under cell 20 and the other 10 junctions are mounted under cell 21. The ends of all cells are covered with gas tight windows of calcium fluoride or other infra-red transmitting window material. Wires 31 and 32 from the thermopile 30 are brought to a high gain D. C. amplifier 35 to measure the signals appearing in the thermopile 30.

In order to secure optical balance of the instrument, the following test can be carried out. To obtain clear cell optical balance both sensitizing cells 20 and 21 contain dry air and the sample cell pressure is alternated between atmospheric pressure and ¼ atmosphere with n-butane being flowed into the sample cell as the gas to be tested. The optical trimmers 23 and 24 are then adjusted for a minimum signal, for example, so that the alternating signal for the thermopile 30 does not exceed + or −0.3 microvolt. Dry air is then flowed through the sample cell and the alternating signal from the thermopile 30 also is + or −0.3 microvolt. With this condition of optical balance radiation emitted or absorbed by the sample gas in cell 1 affects equally both halves of the thermopile 30 and essentially zero alternating signal resulted.

A second test called a sensitization test was then run using air in sensitizing cell 21 and n-butane in cell 20. The apparatus now becomes sensitive to n-butane in the sample stream as follows: The oscillating thermopile signal is small (+ or −0.8 microvolt) when 100% air is being pressurized and expanded in the sample cell 1. The oscillating thermopile signal is large (+ or −15 microvolts) when 100% n-butane is being pressurized and expanded in the sample cell 1. Mixtures of n-butane in air in various relative proportions give intermediaite signals since the amount of radiation emitted from sample cell 1 during the compression cycle is related to the amount of n-butane present in the sample cell 1. The above figures show that radiation from air on compression is negligible, while radiation from n-butane is appreciable. During the expansion cycle, appreciable radiation is absorbed from the surroundings by the n-butane present in the sample cell 1.

The use of the detector or thermopile 30 is as follows: One side of it sees through the sensitizing cell 21 and feels the emission and absorption of the n-butane molecules in the sample cell 1. It therefore heats and cools slightly above and below its average temperature. The second side of the detector or thermopile 30 sees the same scene through all the n-butane molecules in sensitizing cell 20. It is therefore shielded from the sample cell emission and absorption by the same type of molecules. The second side of the detector or thermopile 30 remains at practically a constant temperature. A net alternating detector signal results. With the emitting gas molecules (n-butane) in the sample cell 1 being the same type as the shielding gas molecules (n-butane) in the sensitizing cell, a high selectivity can be realized. In addition, alternate compression and expansion of the sample gas ensures that no net heat is generated. Thus, the average temperature of all parts of the apparatus remains equal to that of the surroundings.

The above data demonstrate the novel generation and elementary use of an oscillating signal by periodic pressure cycles of the gas in the sample cell. The hot infrared source of the prior art has been eliminated. In its place, pulsed characteristic infra-red radiation to and from the sample gas in the cell 1 provides a useful analytical signal from the thermopile 30.

Any desired type of infra-red detector may be employed, provided the detector be of the nature which provides a signal in response to the impingement of infra-red energy upon the detector. Examples of such detectors are resistance thermometers, thermopiles, bolometers, thermistors, thermocouples, pneumatic and photoconductive type cells. These detectors may be designated as infra-red transducers capable of converting impinging infra-red radiation to an electrical signal. It is important that the detectors have a low heat capacity so that the detectors can follow efficiently the radiation to and from the source. In the embodiment illustrated in the drawings, the thermopile is considered to be two infra-red detectors, one of which is disposed in the range of pulsations of radiant energy passing through sensitizing cell 20 and the other which is disposed in the path of pulsations of radiant energy passing through sensitizing cell 21. These two infra-red detectors are connected so that difference in amount of radiation falling upon the detectors simultaneously effects a differential temperature change by the detectors.

The oscillating signal output of the thermal detector can be amplified and recorded for direct use. In addition, it can be synchronously rectified. The rectified signal also can be used in a servo loop to drive an optical trimmer such as 23 or 24 of Figure 1 to maintain a null output from the thermal detector. This is useful where utmost stability is desired and where an automatic process control function is needed.

Procedures of sensitization and elimination of interference in a complex mixture include the following, particularly in the case in which a complicated mixture of hydrocarbons is to be analyzed for one or more key components: It is desirable to fill an interference cell 40 such as shown in Figure 2 of the drawings with one or more of the constituents of the hydrocarbon mixture other than the constituent to be determined. Since all hydrocarbon gases have common infra-red absorbency to some degree, these gases may be considered interfering gases. In some cases, there is very little distinction between absorption spectra of isomers or of adjacent members of a hydrocarbon series. The selectivity of the analytical results can be clearly improved by placing one or more of the interfering gases in the interference cell. It has been found that when the sample is a mixture of hydrocarbon gases, the selectivity as to one component may be substantially improved by employing an interference cell containing the non-key components. The sensitizing cells 20 and 21 are ordinarily used in the following way. One of the cells 20 or 21 is ordinarily filled with a pure sample of the constituent to be determined when the sample stream contains a mixture of gases. The other of the two cells 20 and 21 can in some cases be empty or in other cases can be filled with one or more gases selected to improve the selectivity of the analytical results.

A specific example of the application of the device in a petroleum refinery operation is in the determination of isobutane in the n-butane tower overhead stream coming from an alkylation plant. Such an overhead stream often contains from 0 to 15% isobutane in n-butane. A high value of isobutane in this stream would indicate that the preceding tower is not removing enough isobutane for recycle into the feed. This indicates that isobutane is thus wasted to a fuel line or is sent back to a stabilizer for reprocessing. On the other hand, a low value of isobutane in the n-butane tower overhead means good separation of isobutane from alkylate in the preceding tower for recycling to feed.

In a specific example of the use of the continuous analyzer for the above operation, a sample stream of n-butane tower overhead is vaporized, filtered and pressure regulated to two different pressures for flow through the sample cell 1. The analyzer has previously been sensitized by filling sensitizing cells 20 and 21 to atmospheric pressure with pure isobutane and pure n-butane, respectively. In addition, the optical trimmers 23 and 24 have been adjusted so that when the plant stream contains zero isobutane, that is 100% n-butane, the oscillating thermopile signal is at zero amplitude, or actually a minimum amplitude close to zero.

If now a plant stream or sample containing 15% isobutane in n-butane is put through the sample cell 1 while the pressure in it continues to be cycled between two valves, the oscillating thermopile signal becomes large. The increased size of the amplitude of the recorder trace is a measure of the increased isobutane content of the n-butane plant stream. A calibration which has been determined previously is used to interpret the recorder chart signals. Alternately, one of the optical trimmers may be readjusted manually or by a servo mechanism to bring the thermopile signal back to zero or to a minimum. The amount of the readjustment needed is a measure of the isobutane content of the plant stream. A calibration also can be prepared for this method of detection. The trimmers 23 and 24 are shadow casting devices, for example they can be long 6—32 screws which when screwed into the assembly shield the thermopile 30 from radiation to or from the sample cell.

In the specific example for determining isobutane in n-butane, the optical trimmers were turned 92 turns to maintain a zero thermopile signal output as the sample gas was changed from 100% n-butane to 100% isobutane. This shadow casting by the trimmers to retain a null signal in the above test corresponded to a change of area of 20% in the area of one side of the thermopile 30 exposed to radiation from the sample cell 1. This is a very large and desirable change in trimmer setting. It is to be compared to a similar experiment where 1 or 2 trimmer turns only are obtained from the same instrument with a 25-watt infra-red source shining through the sample cell 1 containing the same gases at atmospheric pressure, not cycled.

The pressures used in the pressure cycled example were 1 atmosphere and 0.2 atmosphere. The time cycle was 1 minute with the high pressure and 1 minute with the low pressure. The gas flows were adjusted so that the sample cell 1 would be just filled or exhausted by the time the solenoid valves 7 and 15 switched to reverse the pressure.

The proper timing of the pressure cycle is determined mostly by the heat capacity of the detector. Bulky detectors are slow to respond to the pulsed radiant energy and therefore require a large time cycle. Low mass detectors respond rapidly so that the pressure cycling may be rapid. Too rapid cycling becomes difficult to detect without resorting to elaborate electronic circuits. The purpose of using pulsations of radiant energy is to eliminate the slow zero drifts encountered in steady state detectors (no cycling) and also to avoid the use of elaborate electronics and rotating shutters needed where the cycling occurs in 1 second or less. The preferred total cycle time range when operating by using a gas sample which is alternately pressurized and de-pressurized in a sample cell is from 15 seconds to 2 minutes, but a total time cycle range from 1.0 second to 10 minutes can be used.

Pressures from 0.1 to 100 atmospheres within the sample cell 1 are contemplated. Optimum pressures between which to work are often determined by outside factors. For example, the gas sample may condense if too high a pressure is used, or the sample stream is not available at any higher pressure without using a pump. In general, the two pressures should have as large a pressure ratio between them as possible to take advantage of the maximum adiabatic compressional radiation and adiabatic expansional absorption of infra-red energy. This is the energy which falls on the detector to heat it up or leaves the detector to cool it off. This energy is characteristic of infra-red absorbing gases and does not exist in gases like nitrogen, oxygen, hydrogen, etc. which have no normal infra-red absorption spectrum. Gases other than the hydrocarbons which absorb in the infra-red include water, ammonia, carbon monoxide, carbon dioxide, sulphur dioxide, etc.

A modification of the device is illustrated in Figure 2 which is applicable when the gaseous mixture of isobutane and n-butane contains a few percent of another hydrocarbon such as $C_5$ hydrocarbons. This involves the use of an interference cell 40 which is disposed between the sample cell 1 and sensitizing cells 20 and 21. This interference cell 40 is used for improving the selectivity of the analyzer for key components in multi-component streams. For example, for improving the selectivity of the analyzer for isobutane in the gaseous mixture of n-butane and $C_5$ hydrocarbons. To eliminate any cross sensitivity to the $C_5$ hydrocarbons, the interference cell 40 is placed across the entire field of view immediately below the sample cell 1 and filled permanently with the $C_5$ hydrocarbons. The interference cell in effect acts as a filter for any radiation from these $C_5$ gases in the sample cell. The interference cell 40 can be as long or longer than the sample cell 1.

In general, in developing the excellent selectivity of this analyzer to the key component in a multi-component mixture, a typical mixture of the non-key components is permanently sealed in the interference cell. One sensitizing cell is then filled with the key component and the other sensitizing cell is filled with the mixture of the non-key components. This arrangement usually provides key component selectivity that exceeds that obtainable by infra-red spectroscopy.

By obtaining radiant energy in the manner contemplated in this case, many difficulties inherent in the use of a hot source of infra-red radiation are eliminated or minimized. For example, explosion-proofing is not necessary when using the instrument in petroleum oil refineries or chemical processing plants. In the past the hot source has vaporized, it has fogged cell windows, it has burned out. Its temperature has been sensitive to drafts and to line voltage changes. Its radiation characteristics change with its age. Often it has vibrated mechanically or sagged with changes in orientation and often it must be carefully focused in an optical system. It has been a local source of conduction, convection and radiant heat in a system where minute differences in temperature represent the significant physical phenomenon being measured. It has caused drift in the thermal detector. In short, in nondispersion infra-red analyzers the hot source has been the cause of many practical difficulties which have limited the wide application of this very useful instrument.

In addition to eliminating or minimizing the above difficulties, the novel method of producing radiant energy described in this case permits the average temperature of all of the instrument parts to remain equal to that of the ambient. Also it provides an added degree of selectivity not available with the usual hot black body radiator. This novel infra-red source need not be explosion-proof for use in hazardous locations.

Still other variation and modification of the invention may become apparent to those skilled in the art without departing from the present teaching for which protection by Letters Patent is being secured within the following scope of the appending claims.

I claim:

1. Apparatus for determining a component in a mixture of gases which radiate on compression or absorb on expansion, comprising in combination two infra-red detectors having low heat capacity and connected so that difference in amount of radiation falling upon the detectors simultaneously effects differential change between the detectors, a source of radiation including means for pressurizing and de-pressurizing the mixture in a sample cell to produce pulsed radiant energy characteristic of the gases in the mixture, sensitizing cells in the range of the pulsations of radiant energy between said source and the detectors to provide selective filtration whereby the device is sensitive only to a key component in the mixture, and means for measuring the difference in the pulses of radiant energy falling upon the two detectors.

2. Apparatus for determining a component in a hydrocarbon mixture according to claim 1 in which optical trimmers are disposed between the sample cell and the sensitizing cells in the range of the pulsations of radiant energy.

3. Apparatus for determining a component in a mixture of hydrocarbon gases, comprising in combination two infra-red detectors having low heat capacity and connected so that a difference in the amount of radiation falling upon the detectors simultaneously effect differential change between the detectors, a source of radiation including means for pressurizing and de-pressurizing the mixture in a sample cell to produce pulsed radiant energy characteristic of the gases in the mixture, a first cell containing a pure sample of the component to be determined inserted in the range of pulsating radiant energy between said source and one of the two detectors, a second cell containing the same gaseous mixture as the sample cell and located in the range of pulsations of radiant energy between said source and the second detector, and means for measuring the difference in the pulses of radiant energy falling upon the two detectors.

4. Apparatus for determining a component in a mixture of gases according to claim 3 in which the means for pressurizing and de-pressurizing the mixture in a sample cell to produce pulsed radiant energy characteristic of the gases in the mixture operates to pressurize to 1 atmosphere and to de-pressurize to 0.2 atmosphere.

5. Apparatus for determining a component in a mixture of gases according to claim 3 in which the means for pressurizing and de-pressurizing the gaseous mixture operates at a total time cycle of about 1.0 second to 10 minutes.

6. Apparatus for determining a component in a gaseous mixture according to claim 3 in which the means for pressurizing and de-pressurizing the gaseous mixture operates at pressures of about 0.1 to 100 atmospheres.

7. Apparatus for determining a component in a mixture of gases according to claim 3 in which the means for pressurizing and de-pressurizing the gaseous mixture operates in a pressurizing and de-pressurizing cycle of about 1 minute for the high pressure and about 1 minute for the low pressure.

8. A method for the analysis of a mixture of gaseous materials for a key component thereof, which comprises introducing a portion of said mixture into a confined receiving zone therefor and over a predetermined period of time, while introducing said portion into said zone, initially decreasing the translational energy of the molecules of the respective components of the mixture in said portion whereby said molecules absorb energy from their environment, and then inducing progressively increasing molecular translational energy in said molecules, producing the emission of absorbed energy as infrared radiation in the frequencies characteristic of the molecules of each component and of increasing intensity during said time period, filtering said radiation to absorb radiation in the frequencies other than that of said key component molecules, and exhibiting the differential intensity of said unabsorbed radiation through said period of time as a measure of the content of said key component in said gaseous mixture portion.

9. A method for the analysis of a mixture of gaseous materials for a key component thereof, which comprises introducing a portion of said mixture into a confined receiving zone, initially reducing the pressure on said material as introduced, continuing the introduction of said material portion while progressively increasing the pressure thereon in said zone over a predetermined period of time thereby initially decreasing the molecular translational energy of the material in said portion by the reduction of pressure thereof causing said material to absorb energy from its environment and subsequently and progressively increasing the molecular translational energy of the material in said portion by the increase of pressure thereon causing said material portion to release energy by emission of infra-red radiation in the frequencies characteristic of the molecules of the respective components thereof and of increasing intensity, filtering said radiation substantially to absorb frequencies other than those characteristic of the key component, and exhibiting the differential intensity of said unabsorbed radiation through said period of time as a measure of the content of said key component in said gaseous mixture.

10. A method for analysis of a mixture of gaseous materials for a key component thereof, which comprises segregating a portion of said mixture in a receiving zone therefor, initially cooling said portion in said zone and then heating said portion in said zone over a predetermined period of time generating radiant energy over said period of time in the molecules of the components of said mixture portion during said heating step which energy is emitted by said molecules in the form of infra-red radiation in the frequencies characteristic of said component molecules, filtering said radiation to absorb frequencies other than that characteristic of said key component molecules, and exhibiting the differential intensity of said unabsorbed radiation over said period of time as a measure of the content of said key component in said gaseous mixture.

11. A method for analysis of a mixture of gaseous materials for a key component thereof which comprises initially cooling a portion of said materials by introduction into a confined receiving zone held at a reduced pressure lower than that of said portion, thereby causing said material to absorb heat energy from its invironment, then progressively increasing the pressure in said zone, over a predetermined period of time to the initial pressure of said material portion, thereby causing said material to emit heat energy in the form of infra-red radiation, in frequencies characteristic of the molecules of each component of said mixture and said material portion, of increasing intensity, filtering the radiation emitted to absorb frequencies other than those characteristic of the key component, and exhibiting the differential intensity of said unabsorbed radiation over said period of time as a measure of the content of said key component in said gaseous mixture.

References Cited in the file of this patent

UNITED STATES PATENTS

| | | |
|---|---|---|
| 2,519,081 | Skarstrom | Aug. 15, 1950 |
| 2,555,327 | Elliot | June 5, 1951 |
| 2,648,775 | Waters | Aug. 11, 1953 |
| 2,670,649 | Robinson | Mar. 2, 1954 |